United States Patent
Fukui et al.

[11] Patent Number: 4,478,049
[45] Date of Patent: Oct. 23, 1984

[54] AIR-CONDITIONING CONTROL FOR A MOTOR VEHICLE

[75] Inventors: Tomonori Fukui, Kariya; Osamu Eguchi, Kuwana, both of Japan

[73] Assignee: Nippondenso Co., Ltd., Kariya, Japan

[21] Appl. No.: 417,611

[22] Filed: Sep. 13, 1982

[30] Foreign Application Priority Data

Sep. 15, 1981 [JP] Japan .............................. 56-145675
Apr. 13, 1982 [JP] Japan .............................. 57-62193
Jul. 30, 1982 [JP] Japan .............................. 57-134371

[51] Int. Cl.$^3$ .......................... B60H 1/24; F24F 7/06
[52] U.S. Cl. .................................... 62/179; 62/244; 98/2.01; 236/49; 165/16
[58] Field of Search ............... 62/78, 186, 158, 244, 62/179; 236/49, 46 F; 98/2.01, 2.06, 2.11; 165/12, 16, 43, 42; 364/418

[56] References Cited

U.S. PATENT DOCUMENTS 4,259,722 3/1981 Iwata et al. ................ 165/42 X

FOREIGN PATENT DOCUMENTS 53394 6/1982 European Pat. Off. ............ 98/2.01
2903643 8/1980 Fed. Rep. of Germany ....... 98/2.01
126645 11/1978 Japan .................................. 98/2.01

Primary Examiner—Harry Tanner
Attorney, Agent, or Firm—Cushman, Darby & Cushman

[57] ABSTRACT

A gas sensor is provided to detect the concentration of a gas component included in external air which may be led into the compartment of a motor vehicle. When the level of an output signal from the sensor exceeds a first predetermined value, the air-conditioning system is switched to internal air recirculation mode so that unclean external air is not led into the vehicle compartment. When the level of the gas sensor output is continuously kept below a second predetermined value, which is smaller than the first predetermined value, for a predetermined period of time, the system is switched to external air introduction mode. Instead of directly comparing the level of the gas sensor output with the first and second predetermined levels, a relative value of the gas sensor output may be compared therewith. In one embodiment, it is detected whether the motor vehicle travels in a city area or suburb from the varying state of the gas sensor output or its relative value so that the first predetermined value may be set to either higher or lower value.

11 Claims, 7 Drawing Figures

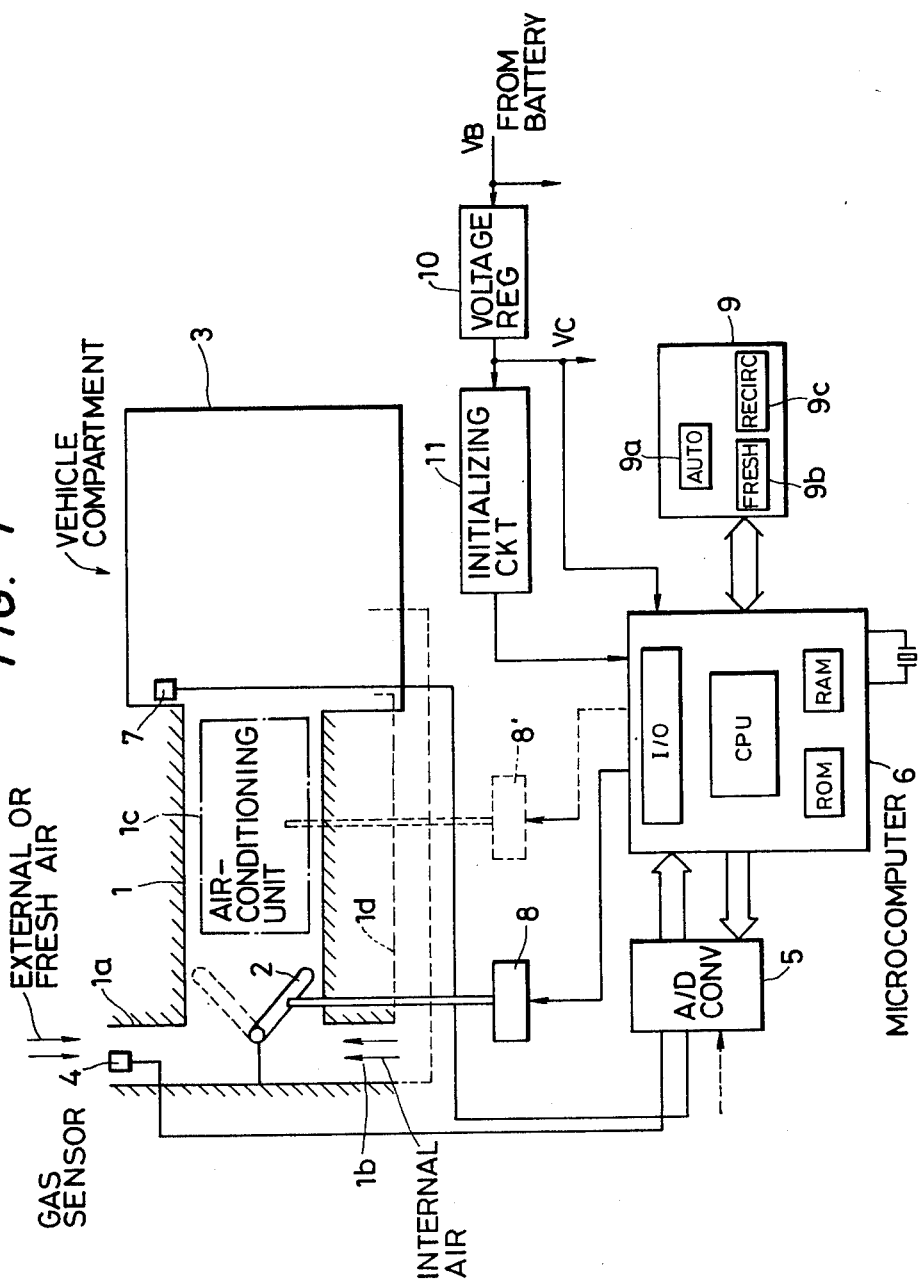

AIR-CONDITIONING CONTROL FOR A MOTOR VEHICLE

BACKGROUND OF THE INVENTION

This invention relates generally to air-conditioning systems for use with a motor vehicle, such as an automobile, and more particularly, the present invention relates to an air-conditioning system arranged to selectively recirculate the air in the vehicle compartment or introduce external or fresh air into the compartment.

Most of conventional air-conditioning systems used in motor vehicles are arranged so that the air in the vehicle compartment circulates or external air is taken into the compartment where recirculation mode and external air introduction mode may be manually switched from one to the other. According to an improved air-conditioning system disclosed in Japanese patent pulication No. 47-39674, the above-mentioned switching between two modes is automatically effected in accordance with the degree of pollution of the air to be taken into the compartment. Namely, a gas sensor is provided at an external air inlet to produce an electrical signal indicative of the degree of pollution of the external air, and an actuator is driven in accordance with the signal so that the external air is led into the vehicle compartment only when it is clean. The above-mentioned publication only discloses that mode changing is effected from external air introduction mode to internal air recirculation mode when the amplitude of the electrical signal from the gas sensor exceeds a predetermined value.

Inventors of the present invention made experiments so as to reduce the concept disclosed in the above-mentioned publication into practice. First of all, various gas sensors including semiconductor type sensors were investigated, and it has been concluded that a gas sensor of solid thermal conduction type is suitable for an air-conditioning system of a motor vehicle, considering structure and cost of gas sensors. The gas sensor of this type operates as follows. A metal oxide, such as $SnO_2$ or the like, is heated up to 300–500 degrees centigrade, and its thermal conductivity increases when adsorbing an inflammable gas. As a result, heat dissipation is facilitated to cause the temperature of the semiconductor to lower so that the resistance of a platinum filament used for heating the semiconductor decreases.

Using such a gas sensor, the degree of pollution of the air exterior to the vehicle compartment is measured with a motor vehicle travelling in city areas and suburbs. The gas sensor is used as an element constituting a bridge circuit, and the difference in voltages is detected to see the difference in pollution degree in city areas and suburbs. According to the experiments, the maximum differnece voltage is usually 50 mV or so. Therefore, the above-mentioned automatic mode changing control is tried in the experiments with a reference voltage set to 10 mV.

When travelling in city areas, exhaust gases from a motor vehicle which goes ahead are detected each time the motor vehicle equipped with the air-condioning system stops at every intersections, and thus the external air introduction mode is automatically changed to the internal air recirculation mode. As soon as the motor vehicle starts moving again, the internal air recirculation mode is changed to the extenal air introduction mode because the level of the output signal from the gas sensor immediately decreases. Such mode changing is repeatedly occurred frequently, and such frequent mode changinging occurred even in a traffic jam. This means that external air, which is not clean enough, is apt to be introduced into the vehicle compartment. Especially, when the external air latently polluted due to traffic jams, such unclean air cannot be prevented from entering into the vehicle compartment.

Furtheremore, if the signal level of the output from the gas sensor drastically varies, mode changings are continuously occurred from one to the other. Such repetitive and frequent mode changing is uncomfortable to the vehicle occupants, and sometimes, the vehicle occupants may misunderstand that the air-conditioning system malfunctions. Namely, the inventors of the present invention have realized that the technique of mode switching disclosed in the above-mentioned publication cannot be simply applied to an air-conditioning system of a motor vehicle because desirable operation cannot be expected if the mode changing technique is used as it stands

SUMMARY OF THE INVENTION

The present invention has been developed in order to remove the above-described drawbacks inherent to the conventional air-conditioning system for motor vehicles, arranged to switch from external air introduction mode to internal air recirculation mode or vice versa.

It is, therefore, an object of the present invention to provide an air-conditioning system for use with a motor vehicle and a method of controlling the system, so that the system operates in a stable manner to introduce only clean air into the vehicle compartment.

According to a feature of the present invention, the air-conditioning system is arranged to be switched to an internal air recirculation mode whenever the gas sensor output level exceeds a first predetermined value, and to be switched to an external air introduction mode only when the level of the output signal from a gas sensor detecting the pollution degree of the external air, is kept below a second predetermined value which is smaller than the first predetermined, for a predetermined period of time.

According to one embodiment of the present invention, it is detected whether the motor vehicle travels in a city area or suburb from the varying state of the gas sensor output or its relative value. Then the first predetermined value may be set to a higher value when the vehicle travels in a city area, and to a lower value when in a suburb.

BRIEF DESCRIPTION OF THE DRAWINGS

The object and features of the present invention will become more readily apparent from the following detailed description of the preferred embodiments taken in conjunction with the accompanying drawings in which:

FIG. 1 is a schematic block diagram of an embodiment of the air-conditioning system according to the present invention;

The same or corresponding elements and parts are designated at like reference numerals throughout the drawings

DETAILED DESCRIPTION OF THE INVENTION

Figure 2A:
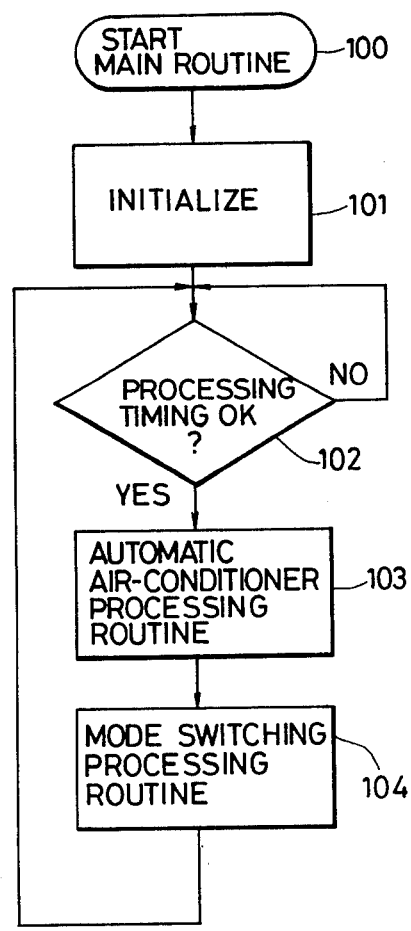
FIGS. 2A and 2B are flowcharts showing the control programs for the microcomputer used in the system of FIG. 1.

Referring now to FIG. 1, a schematic block diagram of an automatic air-conditioning system according to the present invention is shown. The air-conditioning system employs a microcomputer as will be described later so that various parts thereof are satisfactorily controlled.

The system comprises an air-conditioning unit 1c mounted in a duct 1 which communicates with the vehicle compartment 3 at its downstream side. The air-conditioning unit 1c comprises, in the same manner as in the conventional one, a blower, an evaporater for cooling flowing air, a heater for heating flowing air, an air-mixing damper for adjusting hot and cool air proportion, or the like, but these elements are not shown for simplicity because they are well known in the field of motor vehicle air-conditioners.

At the other end, i.e. upstream end, of the duct 1 is provided an external/internal air switching damper 2 which is arranged to be swingably driven by an actuator 8. The upsteam of the duct 1 comprises two air inlets. The first inlet 1a is an external or fresh air inlet which communicates with the exterior of the motor vehicle, while the second inlet 1b is an internal air inlet which communicates via another duct 1d to the interior, i.e. the vehicle compartment 3. The above-mentioned external/internal air switching damper 2, which will be simply referred to as a switching damper 2 hereafter, is positioned so that one of the external air inlet 1a and the internal air inlet 1b is selectively communicated with the duct 1 depending on the position of the switching damper 2.

A gas sensor 4 is provided to the external air inlet 1a so that it produces an electrical output signal indicative of the concentration of noxious gas or gasses included in the external air. The output signal from the gas sensor 4 is fed via an A/D (analog-to-digital) converter 5 to a microcomputer 6 which controls the above-mentioned actuator 8 and another actuator 8' associated with the air-conditioning unit 1.

The A/D converter 5 is also responsive to various signals, such as a signal indicative of the temperature in the vehicle compartment 3, which is detected by a temperatature sensor 7, a signal indicative of the external air temperature. Namely, the A/D converter 5 functions as a multiplexer so that these various analog signals are fed to the microcomputer 6 in response to an instruction signal from the microcomputer 6. Namely, one of the input analog signals is converted into a digital signal in accordance with an instruction from the microcomputer 6.

The gas sensor 4 is of a conventional solid thermal conduction type using a metal oxide semiconductor such as $SnO_2$. This gas sensor 4 is arranged so that its resistance varies when an inflammable gas is attached thereto. If desired, however, other type of gas sensors may be used.

The actuator 8 for driving the switching damper 2 is of electromechanical type, such as a diaphragm actuator using the vacuum pressure from the engine of the motor vehicle. Namely, the actuator 8 normally puts the switching damper 2 in its first position in which the external air inlet 1a communicates with the duct 1 by using the vacuum pressure, and is energized when a control signal is fed from an output latch of the microcomputer 6 so that the switching damper 2 is moved to its second position in which the internal air inlet 1b communicates with the duct 1.

The other actuator 8' associated with the air-conditioning unit 1c is also of electromechanical type, and is responsive to another control signal from the microcomputer 6 so that the air-conditioning unit 1c operates in accordance with a predetermined program so that operation is automatically controlled.

A manipulation panel 9 which also functions as a display unit is provided. The manipulation panel 9 includes a switch 9a with which the air-conditioning system is put in automatic mode. Namely, the switch 9a may be depressed when it is intended to operate the air-conditioning system in automatic mode rather than in manual mode. A lamp (not shown) is built in the switch 9a, and is arranged to emit light when the switch 9a is depressed to indicate that the air-conditioning system is in automatic mode. Two other similar switches 9b and 9c are provided for manually selecting one of the external air introduction mode and the internal air recirculation mode. The reference "FRESH" on the switch 9b indicates the external or fresh air introcution mode, while the reference "RECIRC" on the switch 9c indicates the internal air recirculation mode. Each of these two switches 9b and 9c is equipped a built-in lamp arranged to be energized in the same manner as that in the switch 9a. These switches 9a, 9b and 9c may be of self-returning open-close type having a spring therein. Signals generated by these switches 9a, 9b and 9c are fetched into the microcomputer 6 at a given interval.

A voltage regulator 10 is connected to a battery mounted on the motor vehicle and is arranged to generate a stabilized voltage Vc when an unshown key switch of the motor vehicle is turned on. The stablized voltage Vc is fed to the microcomputer 6 and to an initializing circuit 11 which is arranged to produce a START signal in response to the leading edge of the stabilized voltage Vc. The START signal is fed to the microcomputer 6 so that operation of the program of the microcomputer 6 is started from an initial address thereof.

The automatic air-conditioning system of FIG. 1 operates as follows in accordance with the program of FIGS. 2A and 2B. When power, i.e. the above-mentioned stabilized voltage Vc, is fed to the microcomputer 6, at step 100 of FIG. 2A, initialization is effected in response to the START signal from the initializing circuit 11 so that initialization of variables necessary for effecting various controls is effected in step 101. In the following step 102, it is detected whether a given operational processing timing arranged at a given interval has been reached or not. If the answer of step 102 is YES, the following automatic air-conditioner processing routine 103 and mode switching processig routine 104 are executed in a sequence. These two routines 103 and 104 are periodically executed at an interval of 100 ms or so.

In the automatic air-conditioner processing routine 103, the air-conditioning unit 1c is controlled in accordance with the signals from the interior temperature sensor 7 and other unshown sensors so that air-conditioning of the vehicle compartment 3 is effected in the same manner as in conventional systems. Further detailed description of the routine 103 is omitted because it is well known in the art and is not directly related to the pith of the invention. The mode switching processing routine 104 is shown by way of a detailed flowchart of FIG. 3, and will be described therewith later.

Figure 2B:
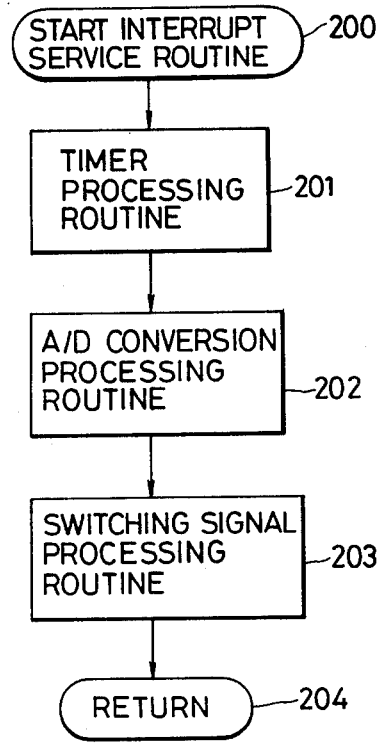

The operational flow shown in FIG. 2A constitutes a main routine, and the microcomputer 6 is arranged to operate, basically in accordance with this main routine. On the other hand, a timer interrupt service routine of FIG. 2B is periodically executed at an interval of 10 ms or so. Namely, each time the count of a time-measuring counter built in the microcomputer 6 reaches a value corresponding to a given interval such as 10 ms, the operation of the main routine of FIG. 2A is interrupted to execute the timer interrupt service routine of FIG. 2B. After the execution of the timer interrupt service routine, the operational flow returns to the main routine.

In the timer interrupt service routine, when an interruption command is fed from the time-measuring counter, the program address of the main routine is stored in a saving register so that the following timer processing step 201, A/D converting step 202, and switch signal processing step 203 are executed in a sequence. Then in step 204 the saved program address is read out from the saving register to restart the execution of the main routine.

In the timer processing routine 201, increment is effected in connection with the timer counter To, which is actualized by a portion of the memory, of the microcomputer each time the timer interruption service routine is executed, and the count thereof is used so that it is detected to see whether the count has reached a predetermined value or not in the step 102 of the main routine. The timer counter To is arranged such that further increment after reaching the predetermined value causes the count to return to zero.

In the A/D conversion processing step 202, instructions are fed to the A/D converter 5 of FIG. 1 so that analog signals from the sensors 4 and 7 and another analog signal indicative of the vehicle speed are selectively converterd into digital signals to be fed to the microcomputer 6. The covnerted digital signals are respectively stored in given addresses of the memory of the microcomputer 6. In order to prevent noises the digital values obtained in this way may be averaged so that average values may be used.

Subseqently in the switch signal processing routine 203, the on-off state of each of the switches 9a, 9b and 9c of the manipulation panel 9 is detected one after another. In the presence of a command signal from the first switch 9a, operational variables or flags F1 and F2 are set to "0". In the absence of such a command signal from the first switch 9a, if a command signal from the second switch 9b is present, only the flag F2 is set to "1", while the other flag F1 is set to "0". In the absence of the command signals from the first and second switches 9a and 9b, if a command signal from the third switch 9c is present, only the flag F1 is set to "1" while the other flag F2 is set to "0". In the case that none of the command signals from the first to third switches 9a, 9b and 9c is present, flags F1 and F2 are maintained as before.

Figure 3:
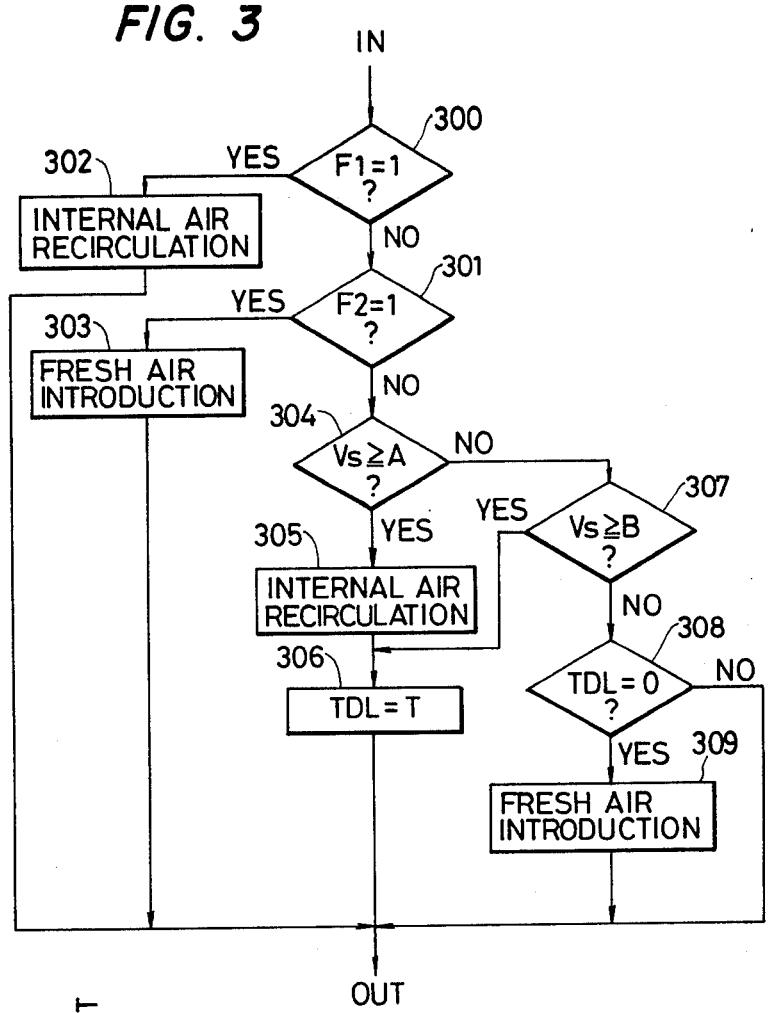
FIG. 3 is a detailed flowchart showing a portion of the flowchart of FIG. 2A.

Reference is now made to FIG. 3 showing the detailed steps included in the above-mentioned mode switching routine 104 of the main routine illustrated in FIG. 2A. In steps 300 and 301, the states of the flags F1 and F2 are checked to detect what kind of mode has been instructed from the operator or user by means of the first to third switches 9a, 9b and 9c.

If the second switch 9b has been depressed, namely, if the operator has selected internal air recirculation mode, the flag F1 assumes "1" so that a step 302 takes place in which a control signal is fed from the computer 6 to the actuator 8. Accordingly, the air switching damper 2 is driven so that the second inlet 1b communicates with the duct 1 to establish the internal air recirculation mode. On the contrary, if the third switch 9c has been depressed, the flag F2 assumes "1", and thus a step 303 takes place in which the control signal is cancelled so that the actuator 8 drives the air switching damper 2 in a way opposite to the above. Namely, the air switching damper 2 is moved so that the first inlet 1a communicates with the duct 1 to establish the external or fresh air introdution mode. In this way, one of the two modes may be manually selected by manipulating the second and third switches 9a and 9b so that a desired mode is established.

Figure 4:
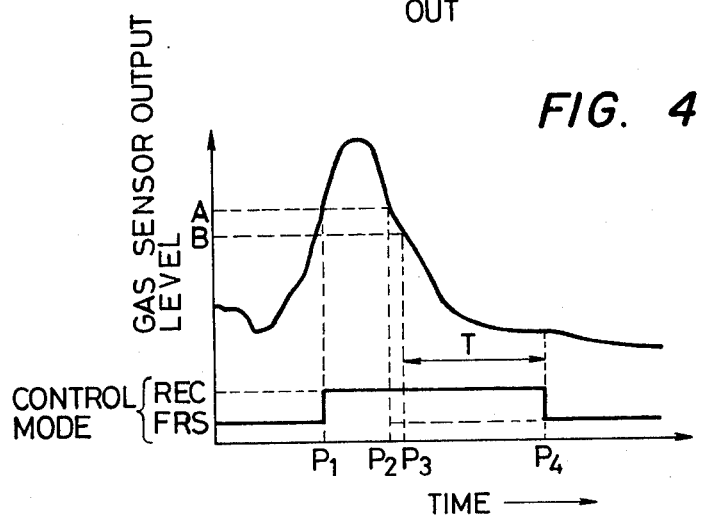
FIG. 4 is an explanatory diagram useful for the description of the operation of the system of FIG. 1.

If the first switch 9a has been depressed or none of the three switches 9a, 9b and 9c has been depressed from the beginning, an automatic mode switching control is effected in steps 304 to 309 of FIG. 3 in accordance with the output signal level from the gas sensor 4. This automatic control will be described in detail with reference to FIG. 4 showing the relationship between the level of the gas sensor output and the internal air recirculation mode (REC) and the external or fresh air introduction mode (FRESH). Assuming that the level Vs of the gas sensor output varies as shown, when the level Vs exceeds a first predetermined value "A", mode switching is effected from the external air introduction mode to the internal air recirculation mode at time $P_1$. Suppose the level Vs then lowers to be below the first predetermined value "A" at time $P_2$, and it further lowers. Even when the level Vs lowers to be below a second predetermined value "B" which is smaller than the first predetermined value "A" at time P3, the internal air recirculation mode is continuously maintained. If this state of Vs<B lasts for a predetemriend period of time T, then the operating mode is returned to the external air introduction mode at time $P_4$.

Turning back to FIG. 3, in step 304, the gas sensor output level Vs is compared with the first predetermined value "A". If the level Vs is greater than or equal to the first predetermined value "A", step 305 takes place which is substantially the same as the step 303 so that the internal air recirculation mode is established. In step 306 following the step 305, the above-mentioned predetermined period of time T is set in a down counter C1 functioning as a delay timer. The reference TDL indicates the count of the down counter C1. On the other hand, if the the level Vs is smaller than the first predetermined value "A", step 307 takes place to detect whether the level Vs is greater than or equal to the second predetermined value "B" or not. If the level Vs is greater than or equal to the second predetermined value "B", namely if Vs≧B, the above-mentioned step 306 takes place so that the predetermined period of time T is set in the down counter C1. If the level Vs is smaller than the second predetermined value "B", namely, if Vs<B, the count TDL of the down counter C1 is detected to see whether the count TDL has reached zero in step 308. If the count TDL is zero, step 309 which is the same as the step 303 takes place to establish the external air introduction mode. The count TDL of the down counter C1 is processed in step 201 of the interrupt service routine of FIG. 2 together with processing of other timers.

Figure 5:
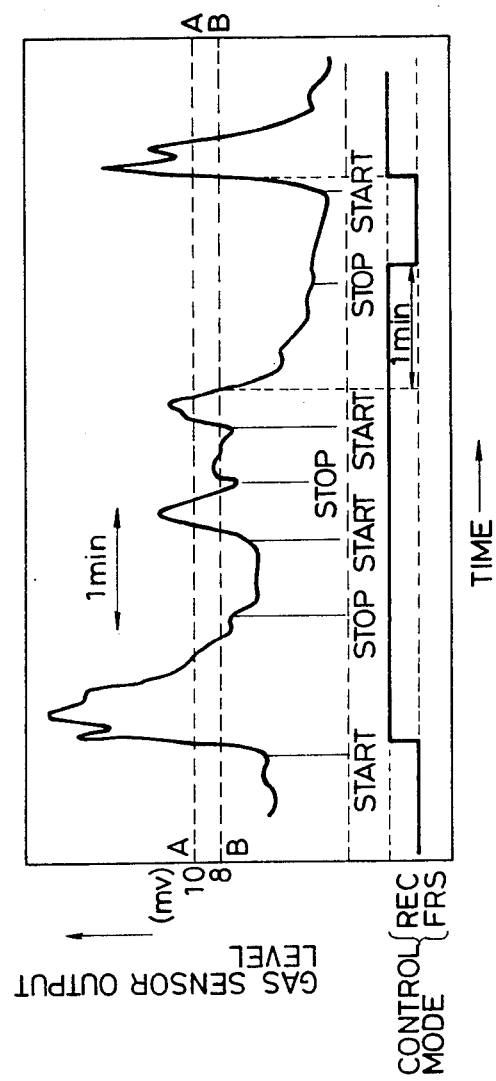
FIG. 5 is a time chart showing the results of experiments made by using a motor vehicle actually travelling various places.

FIG. 5 shows the results of experiments made in connection with a motor vehicle actually travelling in city areas and suburbs. It will be understood from FIG. 5 that the mode switching operation is stable irrespective of drastic variations in the level Vs of the gas sensor output. In this example, the first and second predetermined values "A" and "B" are respectively set to 10 mV and 8 mV, while the predetermined period of time T is set to 1 minute. However, these values may be changed if desired.

In the above-described embodiment, the level Vs of the gas sensor output is directly compared with the first and second predetermined values "A" and "B". However, such direct comparison may suffer from undesirable control of mode switching due to variaion in ambient temperature, humidity and secular change of the gas sensor 4. In order to compensate for such undesirable variation a relative value Vr may be used instead of the actual level Vs of the gas sensor output. Such a relative value Vr may be produced by producing a difference signal between the actual output level Vs and a reference value Vo which may be the minimum value of the gas sensor output level Vs obtained after the system has been supplied with power.

Another embodiment of the present invention will be described with reference to FIG. 6. Although the first predetermined value "A" in the above-described embodiment is fixed, this reference "A" may be changed in accordance with the place where the motor vehicle travels. Assuming that the relative value Vr, i.e. Vs−Vo obtained from a solid thermal conduction type gas sensor, is compared with the first predetermined value "A", inventors realized that the value "A" may be set to a higher value, such as 15 mV, when the motor vehicle travels in city areas, while the value "A" may be set to a lower value, such as 5 to 10 mV, when in suburbs in order to detect exhaust gasses emitted from one or more motor vehicle running ahead.

In the following embodiment therefore, the first predetermined value "A" is changed to a higher or lower value in accordance with the place where the motor vehicle travels. This is automatically done as follows. An up-down counter C2 actualized by the memory of the microcomputer 6 is utilized to see whether the motor vehicle travels in a city area or suburb. The count N of the up-down counter is arranged to vary between 0 and 5, and the count N is arranged to increase or decrease in accordance with the state of variation in the relative value Vr. The count N is periodically detected to see whether the count N is greater than a predetermined value, such as 3, so that one of the above-mentioned higher value TOWN and lower value SUBR is set for the first predetermined value "A". In the case that the lower value SUBR has been set as the first predetermined value "A", the relative value Vr is not needed to be compared with the second predetermined value "B", which is smaller than the lower value SUBR of the first predetermined value "A", to reestablish the external air introduction mode.

Figure 6:
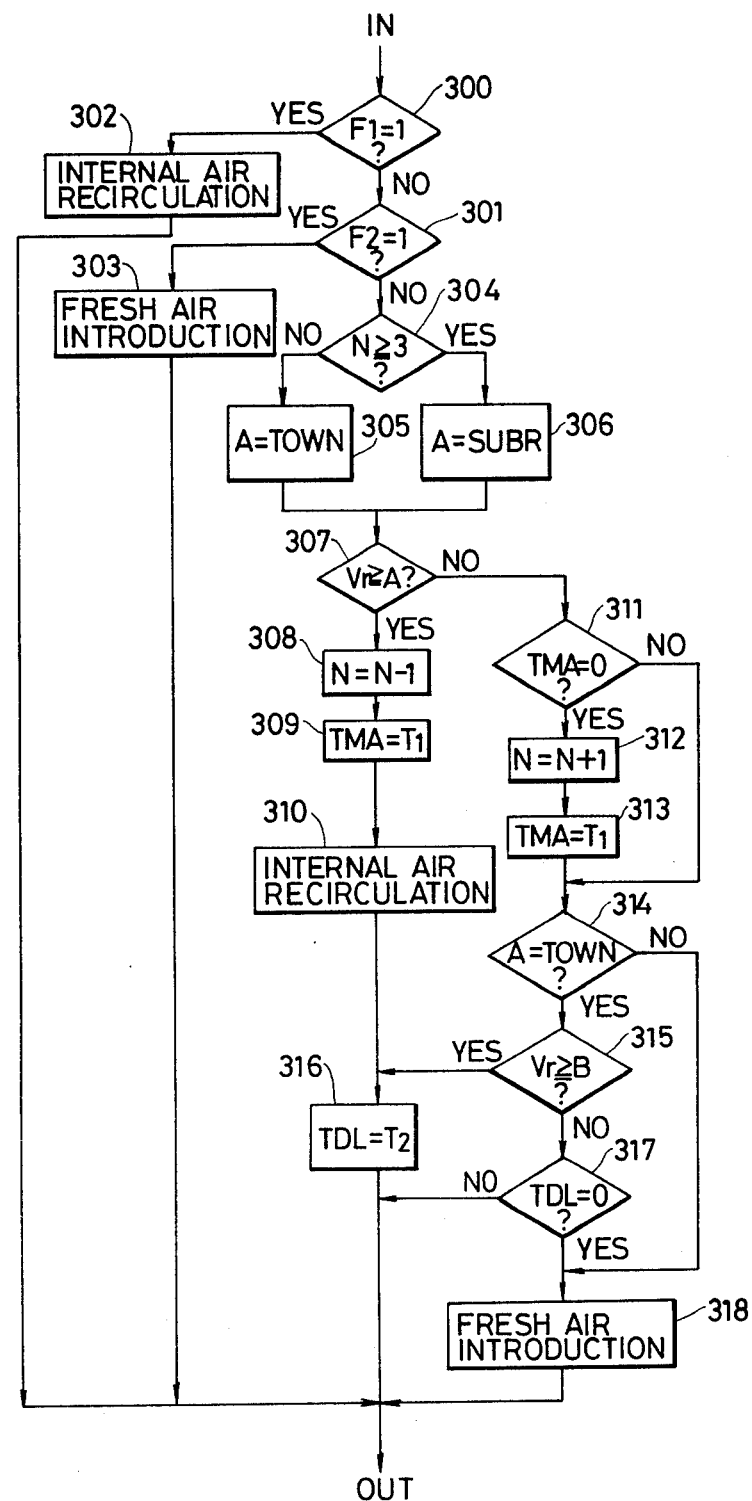
FIG. 6 is a flowchart showing another embodiment of the present invention.

Referring to FIG. 6 showing the second embodiment, steps 300 to 303 are the same as those in the first embodiment of FIG. 3. Steps 307 and 310 in FIG. 6 respectively correspond to steps 304 and 305, while steps 315 to 318 respectively correspond to steps 307, 306, 308 and 309 in FIG. 3. In the embodiment of FIG. 6, new steps 304 to 305 and 308, 309 and 311 to 314 are additionally provided, and the flowchart of FIG. 6 will be described in connection with these new steps. In step 304, the count N of the up-down counter C2 is detected to see whether it is greater than or equal to 3. If the count N is smaller than 3, the first predetemined value "A" is set to the higer value TOWN, such as 15 mV, in step 305. On the other hand, if the count N equals 3 or more, the first predetermined value "A" is set to the lower value SUBR, such as 8 mV, in step 306. After step 305 or 306, the relative value Vr is compared with the first predetermined value "A", which may be one of the higher and lower values TOWN or SUBR, in step 307. If the relative value Vr is greater than or equal to the first predetermined value "A", step 308 takes place in which the count N is decreased by one. Then in step 309, the count TMA of another counter C3, functioning as a down counter, is set to a predetermined value corresponding to a predetermined period of time T1, such as four minutes. This counter C3 is provided to prevent the count N of the above-mentioned up-down counter C2 from increasing immediately after the comparison of the relative value Vr as will be described later. Subsequent to the execution of step 309, a step 310 takes place so that the air-conditioning system is switched to the internal air recirculation mode.

In the case that the relative value Vr is smaller than the first predetermined value "A", step 311 takes place to detect the count TMA of the counter C3. If the count TMA equals zero, namely, if it is detected that the relative value Vr is smaller than the first predetermined value "A" for four minutes, the count N of the up-down counter C2 is increased by one in step 312. Namely, the count N can be increased only when it has been detected that the relative value Vr has been kept below the first predetermined value "A" for four minutes so that distinction between city areas and suburbs is insured. If such a counter C3 were not provided, the count N of the counter C2 is apt to be increased whenever the relative value Vr is smaller than the first predetermined value "A", and thus the lower value may be erronuously set as the first predetermined value "A" during travelling in a city area. After step 312, step 313 which is the same as step 309 is executed so that the count TMA of the counter C3 is set to four minutes. Turning back to step 311, if the count TMA does not equal zero, step 314 takes place. Step 314 also takes place after the execution of step 313. In step 314, it is detected whether the first predetermined value "A" is either the higher value TOWN or the lower value SUBR. If the higher value TOWN has been set, step 315 takes place in which the relative value Vr is compared with the second predetemined value "B" in the same manner as in step 307 of FIG. 3. As mentioned in the above, the steps 316 and 317 respectively correspond to the steps 306 and 308 of FIG. 3. Namely, the predetermined period of time T in FIG. 3 used as a delay time is expressed in terms of $T_2$ in FIG. 6. On the other hand, if the lower value SUBR has been set, step 318 corresponding to step 309 of FIG. 3 takes place so that external air is introduced into the vehicle compartment 3.

From the above, it will be understood that the count N of the up-down counter C2 is regarded as a variable indicative of the place where the vehicle travels and is changed in accordance with the state of variation in the relative value Vr so that the first predetermined value "A" may assume one of the higher and lower values TOWN and SUBR depending on the place where the motor vehicle travels.

As is understood from the steps 314, 315 and 317, only when it is detected that the higher value TOWN has been set for the first predetermined value "A", the delay time $T_2$ provided by the count TDL is involved. In other words, when the higher value TOWN has been set as the first predetermined value "A", the external air introduction mode is established only when the relative value Vr is continuously kept below the second predetermined value "B" for the delay time $T_2$, such as one minute, so that switching to the external air introduction mode is prohibited for the delay time $T_2$. If desired, however, such a delay time, which may be shorter than the above-mentioned delay time $T_2$, may be used when it has been detected that the lower value SUBR was set as the first predetermined value "A".

The above-described embodiments are just examples of the present invention, and therefore, it will be apparent for those skilled in the art that many modifications and variations may be made without departing from the spirit of the present invention.

What is claimed is:

1. An air conditioning system for use with a motor vehicle, comprising:
   (a) an air-conditioning unit arranged to control the temperature of air in the compartment of said motor vehicle by either introducing external air on recirculating internal air in said compartment;
   (b) switching means for switching the airflow led to said air-conditioning unit so that one of said external and internal air is led to said air-conditioning unit in accordance with a control signal;
   (c) means for producing an output signal indicative of the concentration of a gas component included in said external air which may be led into said vehicle compartment; and
   (d) controlling means responsive to said output signal for producing said control signal so that said switching means is controlled such that said internal air is led to said air-conditioning unit when said level of said output signal is equal to or greater than a predetermined value, said controlling means being arranged to change said predetermined value in accordance with the number of times of detecting that said level is greater than or equal to said predetermined value and the number of times of detecting that a predetermined period of time has lapsed after said level becomes below said predetermined value.

2. An air-conditioning system for use with a motor vehicle, comprising:
   (a) an air-conditioning unit arranged to control the temperature of air in the compartment of said motor vehicle by either introducing external air or recirculating internal air in said compartment;
   (b) switching means for switching the airflow led to said air-conditioning unit so that one of said external and internal air is led to said air-conditioning unit in accordance with a control signal;
   (c) means for producing an output signal indicative of the concentration of a gas component included in said external air which may be led into said vehicle compartment; and
   (d) controlling means responsive to said output signal for producing said control signal so that said switching means is controlled, said switching means being controlled such that said internal air is recirculated to be led to said air-conditioning unit when said level of said output signal exceeds a first predetermined value, and said external air is led to said air-conditioning unit when said level of said output signal is continuously kept below a second predetermined value, which is smaller than said first predetermined value, for a predetermined period of time, said controlling means being arranged to change said first predetermined value in accordance with the number of times detecting that said level is greater than or equal to said first predetermined value and the number of times of detecting that a predetermined period of time has lapsed after said level becomes below said first predetermined value.

3. An air-conditioning system as claimed in claim 1, wherein said controlling means is further for determining whether said motor vehicle travels in a city area or a suburb by detecting the state of variation in the level of said output signal, and for changing said predetermined value such that a higher value is set when it is detected that said motor vehicle travels in a city area, and a lower value is set when it is detected that said motor vehicle travels in a suburb.

4. An air-conditioning system as claimed in claim 2, wherein said controlling means is further for determining whether said motor vehicle travels in a city area or a suburb by detecting the state of variation in the level of said output signal, and for changing said first predetermined value such that a higher value is set when it is detected that said motor vehicle travels in a city area, and a lower value is set when it is detected that said motor vehicle travels in a suburb.

5. An air-conditioning system as claimed in claim 3 or 4, wherein said controlling means is arranged to detect the place where said motor vehicle travels by detecting the state of variation and the level of said output signal, further changing a variable in one direction by a predetermined amount each time said level is detected to be greater than or equal to said first predetermined value and in opposite direction by said predetermined amount each time it has been detected that said level is kept below said first predetermined value for a predetermined period of time, and by detecting the value of said variable.

6. An air-conditioning system for use with a motor vehicle, comprising:
   (a) an air-conditioning unit arranged to control the temperature of air in the compartment of said motor vehicle by either introducing external air or recirculating internal air in said compartment;
   (b) switching means for switching the airflow led to said air-conditioning unit so that one of said external and internal air is led to said air-conditioning unit in accordance with a control signal;
   (c) means for producing an output signal indicative of the concentration of a gas component included in said external air which may be led into said vehicle compartment; and
   (d) controlling means responsive to said output signal for producing said control signal so that said switching means is controlled, said controlling means producing a relative value of the level of said output signal by detecting the difference between an actual level and a reference level, said switching means being controlled such that said internal air is recirculated to be led to said air-conditioning unit when said relative value exceeds a first predetermined value, said controlling means being arranged to detect the place where said motor vehicle travels by detecting the state of variation in said relative value, said first predetermined value being set to a higher value when it is detected that said motor vehicle travels in a city area and to a lower value when it is detected that said motor vehicle travels in a suburb, said switching means being controlled such that said external air is led to said air-conditioning unit when said relative value is continuously kept below a second predetermined value, which is smaller than the lower value of said first predetermined value, for a second predetermined period of time after it has been detected that said motor vehicle travels in a city area and when said relative value is continuously kept below said first predetermined value for a predetermined period of time, and it is detected that said motor vehicle travels in a suburb.

7. A method of controlling an air-conditioning system for use with a motor vehicle, which system is arranged to selectively assume an external air introduction mode in which external air is led through said air-conditioning system into the compartment of said vehicle and an internal air recirculation mode in which internal air in said compartment is recirculated through said air-conditioning unit, comprising the steps of:
(a) detecting the concentration of a gas component included in said external air which may be led into the compartment of said motor vehicle;
(b) comparing a value indicative of said concentration with a predetermined value;
(c) setting a predetermined period of time in a counter;
(d) detecting the count of said counter to see whether the predetermined time has passed when said value indicative of said concentration has been detected in the step (b) of comparing to be smaller than said predetermined value; and
(e) establishing said external air introduction mode when it has been detected in the step (d) of detecting that said predetermined period of time has passed;
(f) counting the number of times of detecting that said level is greater than or equal to said predetermined value and the number of times of detecting that a predetermined period of time has lapsed after said level becomes below said predetermined value; and
(g) changing said predetermined value in accordance with a count resulted from the counting step.

8. A method of controlling an air-conditioning system for use with a motor vehicle, which system is arranged to selectively assume an external air introduction mode in which external air is led through said air-conditioning system into the compartment of said vehicle and an internal air recirculation mode in which internal air in said compartment is recirculated through said air-conditioning unit, comprising the steps of:
(a) detecting the concentration of a gas component included in said external air which may be led into the compartment of said motor vehicle;
(b) producing a relative value of said concentration by detecting the difference between an actual value and a reference value;
(c) comparing said relative value with a first predetermined value;
(d) establishing said internal air introduction mode when said relative value is greater than or equal to said first predetermined value;
(e) comparing said relative value with a second predetermined value which is smaller than said first predetermined value when it has been detected in the step (c) of comparing that said relative value is smaller than said first predetermined value;
(f) setting a predetermined period of time in a counter;
(g) detecting the count of said counter to see whether the predetermined period of time has passed when said relative value has been detected in the step (e) of comparing to be smaller than said second predetermined value; and
(h) establishing said external air introduction mode when it has been detected in the step (g) of detecting that said predetermined period of time has passed.

9. A method of controlling an air-conditioning system for use with a motor vehicle, which system is arranged to selectively assume an external air introduction mode in which external air is led through said air-conditioning system into the compartment of said vehicle and an internal air recirculation mode in which internal air in said compartment is recirculated through said air-conditioning unit, comprising the steps of:
(a) detecting the concentration of a gas component included in said external air which may be led into the compartment of said motor vehicle;
(b) producing a relative value of said concentration by detecting the difference between an actual value and a reference value;
(c) setting a first predetermined value to a higher value when a variable is below a predetermined number, and to a lower value when said variable is greater than or equal to said predetermined number;
(d) comparing said relative value with said first predetermined value;
(e) decreasing said variable by 1 when said relative value is greater than or equal to said first predetermined value;
(f) setting a first predetermined period of time in a first down counter;
(g) establishing said internal air introduction mode after the step (f) of setting;
(h) detecting the count of said first down counter to see whether said first predetermined period of time has passed when said relative value is smaller than said first predetermined value;
(i) increasing said variable by 1 when it has been detected in the step (h) of detecting that said first predetermined period of time has passed;
(j) setting said first predetermined period of time in said first down counter;
(k) detecting said first predetermined value to see whether said motor vehicle travels in a city area or a suburb either after said step (j) of setting or when it has been detected that said first predetermined period of time has not passed yet;
(l) comparing said relative value with a second predetermined value which is smaller than the lower value of said first predetermined value when it has been detected in the step (k) of detecting that said motor vehicle travels in a city area;

(m) setting a second predetermined period of time in a second down counter either after the step (g) of establishing or when it has been detected in the step (l) of comparing that said relative value is greater than or equal to said second predetermined value;

(n) detecting the count of said second down counter to see whether the second predetermined period of time has passed when said relative value has been detected in the step (l) of comparing to be smaller than said second predetermined value; and (o) establishing said external air introduction mode either when it has been detected in the step (n) of detecting that said second predetermined period of time has passed or when it has been detected in the step (k) of detecting that said motor vehicle travels in a suburb.

10. An air-conditioning system for use with a motor vehicle, comprising:

(a) an air-conditioning unit arranged to control the temperature of air in the compartment of said motor vehicle by either introducing external air or recirculating internal air in said compartment;

(b) switching means for switching the airflow led to said air-conditioning unit so that one of said external and internal air is led to said air-conditioning unit in accordance with a control signal;

(c) means for producing an output signal indicative of the concentration of a gas component included in said external air which may be led into said vehicle compartment; and (d) controlling means responsive to said output signal for producing said control signal so that said switching means is controlled, said switching means being controlled such that said internal air is recirculated to be led to said air-conditioning unit when said level of said output signal exceeds a first predetermined value, and said external air is led to said air-conditioning unit when said level of said output signal is continuously kept below a second predetermined value, for a predetermined period of time, said controlling means being arranged to detect the place where said motor vehicle travels by detecting the state of variation in the level of said output signal, said controlling means being arranged to change said first predetermined value such that a higher value is set when it is detected that said motor vehicle travels in a city area, and a lower value is set when it is detected that said motor vehicle travels in a suburb.

11. An air-conditioning system for use with a motor vehicle, comprising:

(a) an air-conditioning unit arranged to control the temperature of air in the compartment of said motor vehicle by either introducing external air or recirculating internal air in said compartment;

(b) switching means for switching the airflow led to said air-conditioning unit so that one of said external and internal air is led to said air-conditioning unit in accordance with a control signal;

(c) means for producing an output signal indicative of the concentration of a gas component included in said external air which may be led into said vehicle compartment; and (d) controlling means responsive to said output signal for producing said control signal so that said switching means is controlled, said switching means being controlled such that said internal air is recirculated to be led to said air-conditioning unit when said level of said output signal exceeds a first predetermined value, and said external air is led to said air-conditioning unit when said level of said output signal is continuously kept below a second predetermined value, which is smaller than said first predetermined value, for a predetermined period of time, said controlling means being arranged to detect the place where said motor vehicle travels by detecting the state of variation in the level of said output signal, said controlling means being arranged to detect the state of variation in one direction by a predetermined amount each time said level is detected to be greater than or equal to said first predetermined value and in opposite direction by said predetermined amount each time it has been detected that said level is kept below said first predetermined value for a predetermined period of time, and by detecting the value of said variable, said controlling means being arranged to change said first predetermined value such that a higher value is set when it is detected that said motor vehicle travels in a city area, and a lower value is set when it is detected that said motor vehicle travels in a suburb.

* * * * *